(12) United States Patent
Maletin et al.

(10) Patent No.: US 6,491,841 B1
(45) Date of Patent: Dec. 10, 2002

(54) ELECTROLYTES FOR ELECTROCHEMICAL DOUBLE LAYER CAPACITORS

(75) Inventors: Yuril Maletin, Kiev (UA); Natalie Strizhakova, Kiev (UA); Vladimir Izotov, Kiev (UA); Antonia Mironova, Kiev (UA); Valery Danilin, Kiev (UA); Sergey Kozachov, Kiev (DE)

(73) Assignee: Superfared Ltd. (GB)

( * ) Notice: Subject to any disclaimer, the term of this patent is extended or adjusted under 35 U.S.C. 154(b) by 0 days.

(21) Appl. No.: 09/700,493

(22) PCT Filed: May 18, 1999

(86) PCT No.: PCT/EP99/03412

§ 371 (c)(1),
(2), (4) Date: Nov. 16, 2000

(87) PCT Pub. No.: WO99/60587

PCT Pub. Date: Nov. 25, 1999

(30) Foreign Application Priority Data

May 18, 1999 (UA) .......................................... 98052573

(51) Int. Cl.⁷ .............................................. H01G 9/038
(52) U.S. Cl. ...................... 252/62.2; 361/502; 361/505; 361/504
(58) Field of Search .................. 252/62.2; 361/504, 361/505, 502

(56) References Cited

U.S. PATENT DOCUMENTS

| | | | |
|---|---|---|---|
| 4,216,322 A | 8/1980 | Temme | 544/352 |
| 4,762,629 A * | 8/1988 | Shinozaki et al. | 252/62.2 |

FOREIGN PATENT DOCUMENTS

| | | |
|---|---|---|
| EP | 0 684 620 | 11/1995 |
| JP | 63-127521 | * 5/1988 |

OTHER PUBLICATIONS

Patent Abstracts of Japan vol. 016, No. 582 (E–1300), (Dec. 1992) & JP 04 233211 A (Murata Mgf Co Ltd), (Aug. 1992).
Patent Abstracts of Japan vol. 16, No. 582 (E–1300), (Dec. 1992) & JP 04 233210 A (Murata Mgf Co Ltd), (Aug. 1992).

* cited by examiner

*Primary Examiner*—C. Melissa Koslow
(74) *Attorney, Agent, or Firm*—Nixcon & Vanderhye PC

(57) ABSTRACT

Novel organic electrolytes comprising tetrafluoroborates and hexafluorophosphates of doubly charged cations of N,N-dialkyl-1,4-diazabicyclo[2.2.2]octanediium (DADACO) are disclosed, which have general formula (2), where R is the alkyl $C_1$–$C_4$, and $Y^{31}$ is a $BF_4^-$ or $PF_6^-$ anion. The invention also comprises a process for the preparation of said electrolytes comprising at least one compound of formula (2) and the use of compounds of formula (2) dissolved in an aprotic polar solvent or a mixture of such solvents as an electrolyte for an electrochemical double layer capacitor.

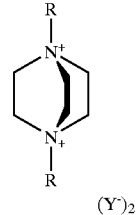

(2)

9 Claims, 4 Drawing Sheets

ELECTROLYTES FOR ELECTROCHEMICAL DOUBLE LAYER CAPACITORS

Figure 1:
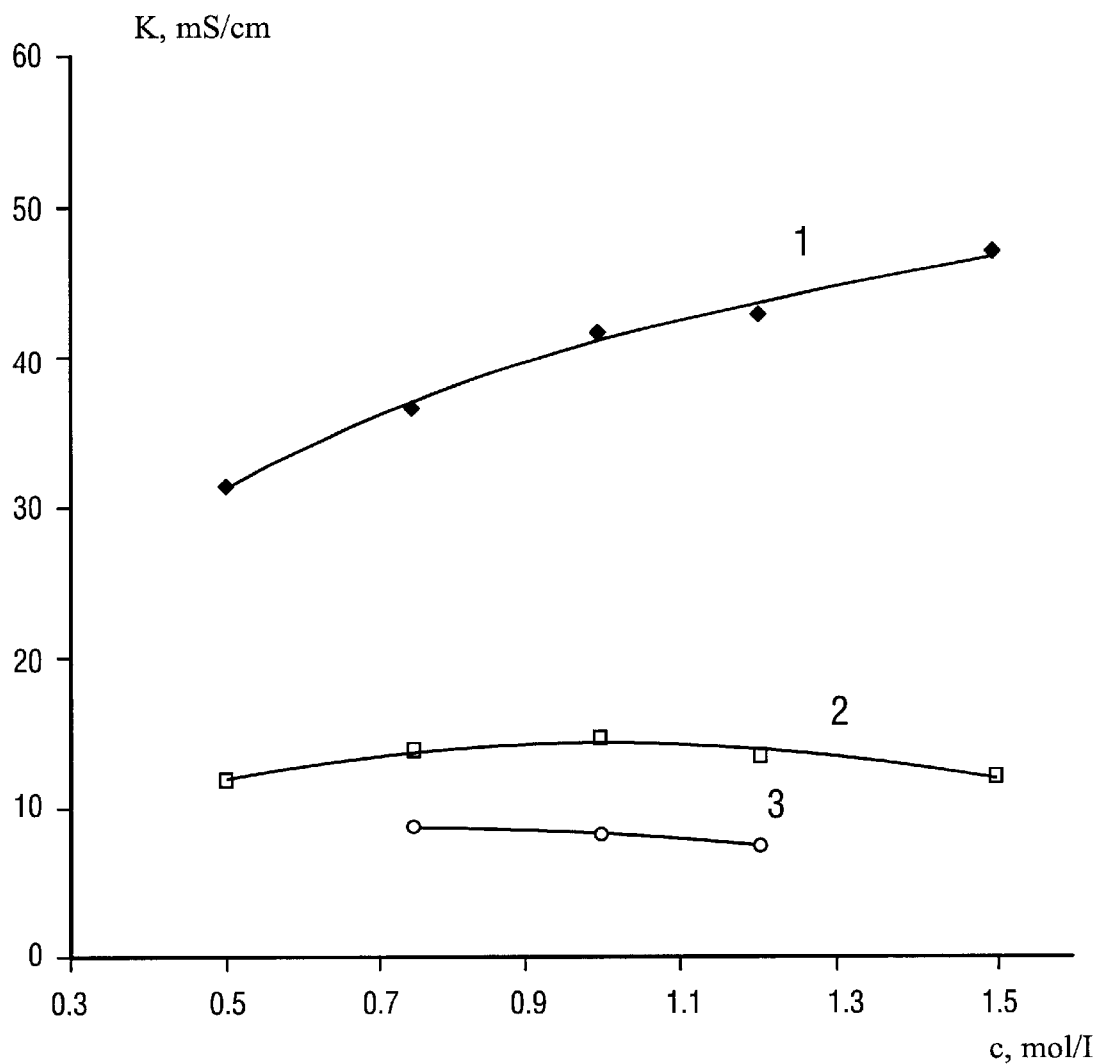

The present invention relates to novel electrolytes for electrochemical double layer capacitors 9EDLC) comprising doubly charged cations of N,N-dialkyl-1,4-diazabicyclo [2.2.2]octanediium (this compound is referred to as DADACO in the remaining description and claims). More particularly, the present invention relates to novel electrolytes comprising at least one salt such as DADACO tetrafluoroborate or hexafluorophosphate dissolved in aprotic polar solvent or mixture of such solvents, a process for their preparation and their use in EDLC.

BACKGROUND ART

Organic electrolytes based on polar aprotic solvents and tetraalkylammonium perchlorates, tetrafluoroborates or hexafluorophosphates are widely used for EDLCs (JP Patents Nos. 49-68254, 1974; 5240025, 1977; 54-9704, 1979; 61-203628, 1986; 61-204927, 1986). They have a notable advantage over the aqueous electrolytes due to their much higher electrochemical stability resulting in higher working voltage. It will be recalled that the energy stored in the capacitor is proportional to its voltage squared:

$$E = 0.5 C U^2. \tag{1}$$

Another advantage of choosing polar aprotic solvents is a wider temperature range since the organic solvents, which are usually used in EDLCs, are liquid within a range of −60° C. to +240° C. However, the solubility of the tetraethylammonium salts mentioned above decreases rapidly with temperature so that, in practice, the lower temperature limit for the use of such electrolytes is usually −20 to −25° C.

In WO95/20231 and Pat RU 2022926 (priority Apr. 26, 1993, publ. Nov. 15, 1994) the present inventors disclosed new tetrafluoroborates and hexafluorophosphates of dialkylamino-phosphonium derivatives to be used as supporting electrolytes in EDLCs. Said amino-phosphonium salts exhibited high solubility in polar aprotic solvents down to −60° C. and smooth temperature dependence of the characteristics of a capacitor mockup.

Besides the great number of salts having a singly charged cation, such as different ammonium, phosphonium, pyridinium. imidazolium and other salts, which have been used in SC electrolytes. salts with doubly and triply charged cations have also been disclosed. Among them are flat aromatic heterocycles: pyridazine (I), pyrimidine (II), pyrazine (III) and also hexahydrotriazine (IV) alkyl derivatives (JP Patents Nos. 4-233210 and 4-233211, 1992) as shown below:

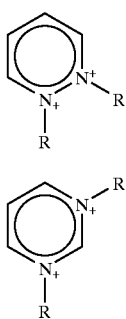

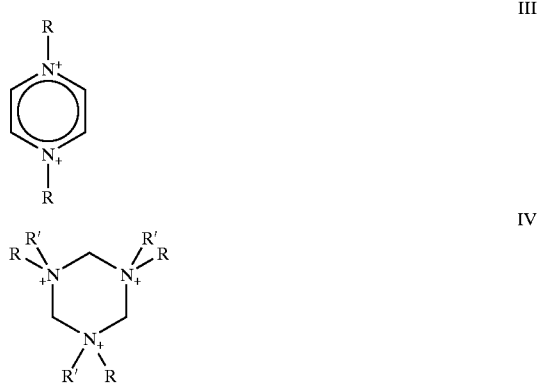

However, as experiments performed by the present inventors have shown, these cations are not electrochemically stable enough so that the organic electrolytes based on their salts cannot be used at voltages higher than 2.5–2.8 V. On the other hand, the idea of using doubly charged cations in the electrolytes for EDLC applications looks very attractive since an increase in the ion charge density would lead to a corresponding increase in the density of a counter-charge induced in an electrode, and as a result, the double layer capacitance would also increase.

SUMMARY OF THE INVENTION

It is an object of the present invention to provide new electrolytes which contain electrochemically and chemically stable doubly charged cations and provide good performance (first of all, higher capacitance and higher working voltage) for EDLC.

It is another object of the present invention to provide new compounds useful as electrolytes for EDLCs and which can easily be synthesized using commercially produced starting materials and minimizing the formation of toxic and environmentally hazardous by-products in course of their preparation and use.

To accomplish these and other objects the present invention provides novel electrolytes according to the attached claims. These are electrolytes for EDLC comprising doubly charged bicyclic cations of N,N-dialkyl-1,4-diazabicyclo [2.2.2]octanediium (DADACO):

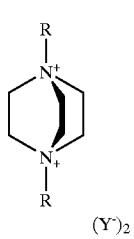

(2)

where R is an alkyl $C_1$–$C_4$, and Y is a $BF_4^-$ or $PF_6^-$ anion.

The DADACO cations according to the present invention surprisingly combine both the high chemical and electrochemical stability of bicyclic systems, besides, the 1,4-diazabicyclo[2.2.2]octane (DABCO) is a commercially available starting compound for synthesis of new doubly charged bicyclic cations.

Figure 2:
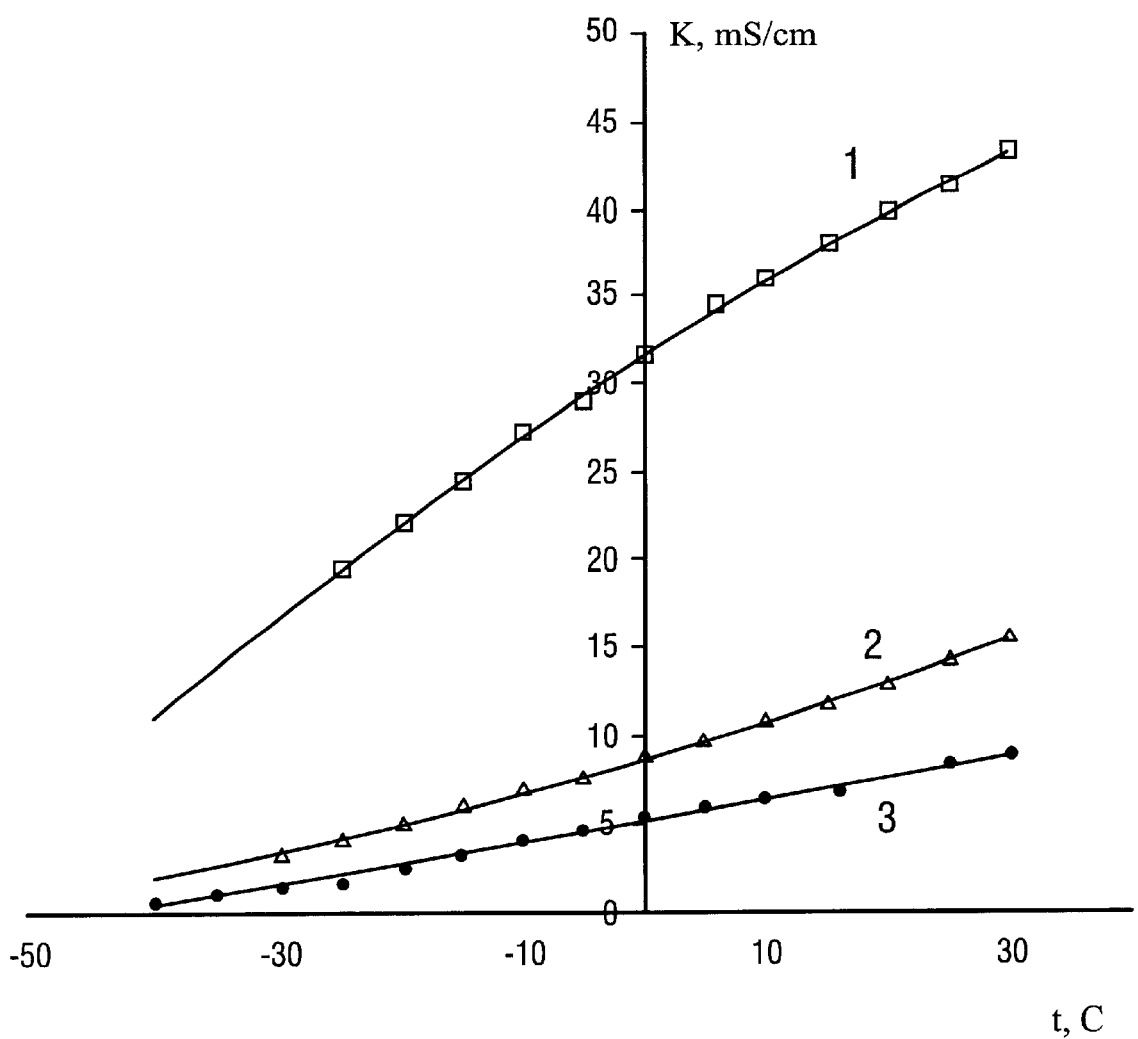
Figure 3:
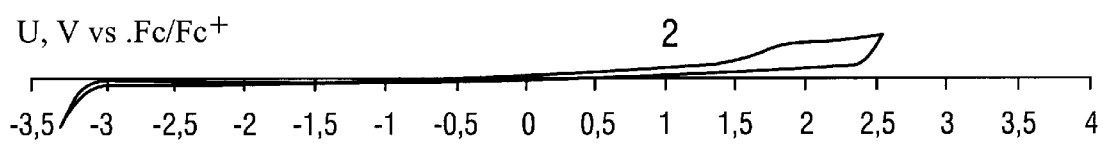
Figure 3:
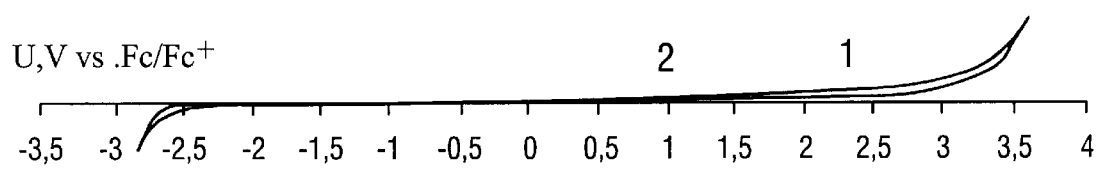

It was surprisingly shown that various DADACO derivatives (R=alkyl $C_1$–$C_4$) can be easily synthesized from DABCO by treating it with a corresponding alkyl bromide followed by substituting the bromide anion with tetrafluoroborate or hexafluorophosphate. Some of the data obtained for DADACO electrolytes are shown in FIGS. 1–3 as well as in Tables 1 and 2. Since the ethyl derivative DEDACO$^{2+}$ (BF$_4^-$)$_2$ has demonstrated the best solubility, conductivity and stability in the experiments performed by the present inventors, this salt was also tested in SC mockups—see in Examples 7–11 for how they were made, and in FIG. 4 and Table 2 for the results.

SHORT DESCRIPTION OF THE DRAWINGS

The invention will be disclosed in closer detail in the description and examples below, with reference to the attached drawings in which:

FIG. 1 is a graph showing plots of conductivity vs concentration for DEDACO$^{2+}$(BF$_4^-$)$_2$ solutions in acetonitrile (curve 1), γ-butyrolactone (curve 2) and propylene carbonate (curve 3).

FIG. 2 is a graph showing plots of conductivity vs temperature for 1 M DEDACO$^{2-}$ (BF$_4^-$)$_2$ solutions in acetonitrile (curve 1), γ-butyrolactone (curve 2) and propylene carbonate (curve 3).

FIG. 3 illustrates electrochemical windows for 1 M DEDACO$^{2-}$ (BF$_4^-$)$_2$ (curve 1) and, for comparison purposes, 1 M TEA$^-$BF$_4^-$ (curve 2) solutions in acetonitrile.

Figure 4:
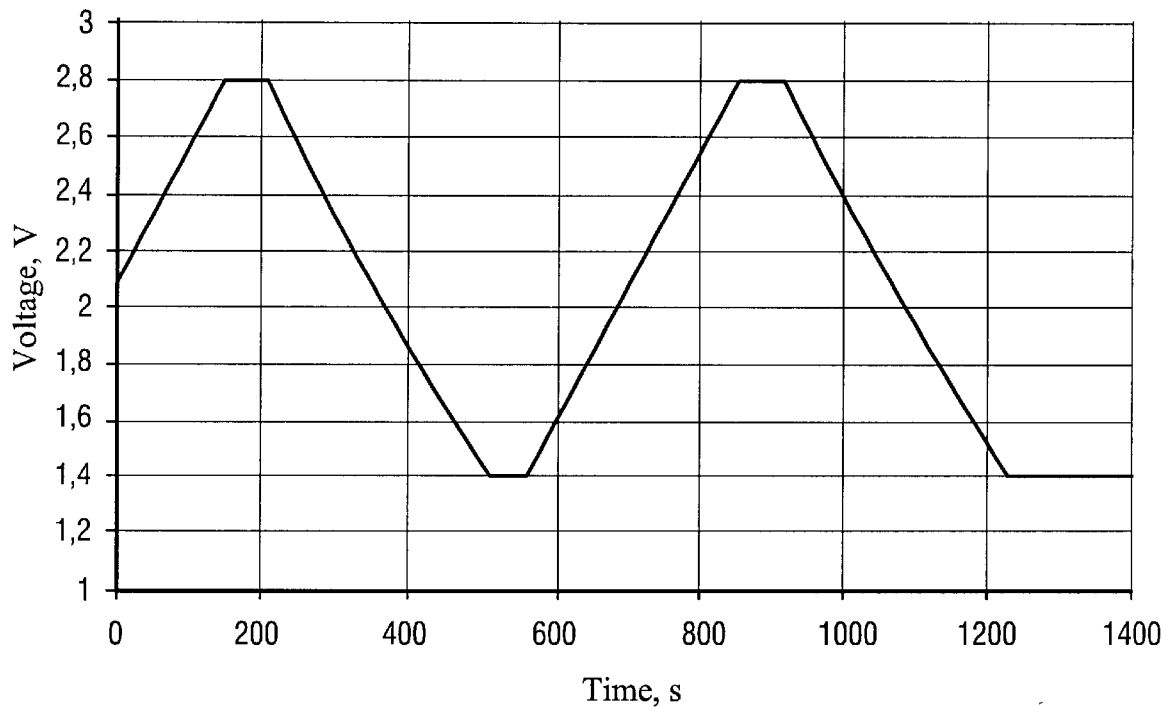
Figure 4:
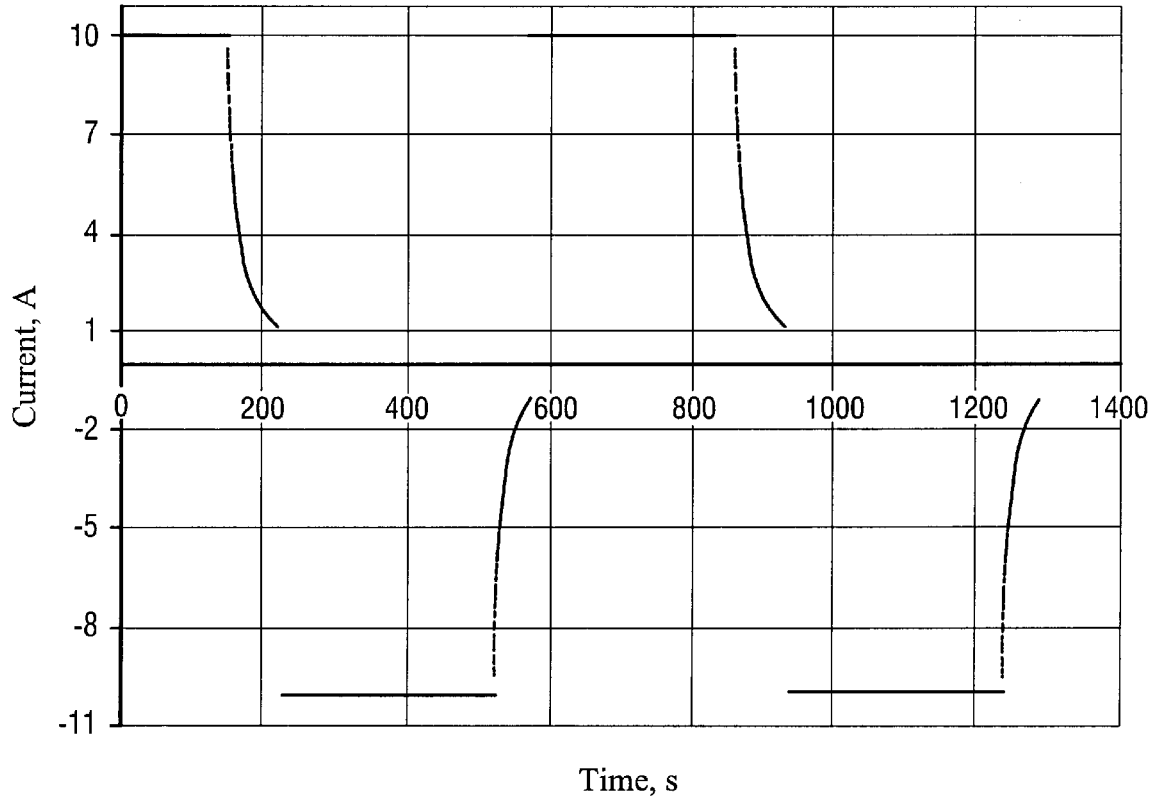

FIG. 4 illustrates the charging/discharge curves for an EDLC mockup comprising a mixture of 0.7 M TEA$^+$BF$_4^-$ and 0.8 M DEDACO$^{2-}$ (BF$_4^-$)$_2$ in acetonitrile. The mockup was charged and discharged under the constant current conditions at current value of 10 A.

DESCRIPTION OF THE INVENTION

Examples of electrolytes according to the invention are:

the solution of N,N-dimethyl-1,4-diazabicyclo[2.2.2] octanediium tetrafluoroborate (DMDACO)$^{2+}$(BF$_4^-$)$_2$ in γ-butyrolactone;
the solution of N,N-diethyl-1,4-diazabicyclo[2.2.2] octanediium tetrafluoroborate (DEDACO)$^{2+}$(BF$_4^-$)$_2$ in acetonitrile;
the solution of N,N -diethyl-1,4-diazabicyclo[2.2.2] octanediium tetrafluoroborate (DEDACO)$^{2+}$(BF$_4^-$)$_2$ in γ-butyrolactone;
the solution of N,N -diethyl-1,4-diazabicyclo[2.2.2] octanediium tetrafluoroborate (DEDACO)$^{2+}$(BF$_4^-$)$_2$ in propylene carbonate;
the solution of N,N -diethyl-1,4-diazabicyclo[2.2.2] octanediium tetrafluoroborate (DEDACO)$^{2+}$(BF$_4^-$)$_2$ in the mixture of propylene carbonate (75% vol) and diglyme (25% vol);
the solution of N,N-diethyl-1,4-diazabicyclo[2.2.2] octanediium tetrafluoroborate (DEDACO)$^{2+}$(BF$_4^-$)$_2$ in the mixture of γ-butyrolactone (75% vol) and methyl ethyl ketone (25% vol);
the solution of N,N-dibutyl-1,4-diazabicyclo[2.2.2] octanediium hexafluorophosphate (DBDACO)$^{2+}$(BF$_6^-$)$_2$ in acetonitrile.

According to a further aspect of the invention there is provided an electrolyte for an EDLC containing at least one DADACO tetrafluoroborate or hexafluorophosphate of the general formula (2) as defined above dissolved in an aprotic polar solvent or, preferably, a mixture of such solvents.

The invention also comprises, as an additional aspect thereof, the use of a DADACO tetrafluoroborate or hexafluorophosphate of the general formula (2) as defined above dissolved in an aprotic polar solvent or a mixture of such solvents as an electrolyte for an electrochemical double layer capacitor.

The electrolyte according to the invention may contain one single compound of formula (2) as defined above or, preferably, a mixture of two or more such compounds. However, the electrolyte according to the invention preferably contains a compound of formula (2) in combination with tetraethylammonium (TEA) tetrafluoroborate, which is a well-known compound to be used in EDLCs.

In addition to the at least one compound of formula (2) the electrolyte according to the invention includes an aprotic polar solvent or a mixture of such solvents.

Preferably said aprotic polar solvent or solvents is/are at least one member selected from the group consisting of acetonitrile, propionitrile, 3-methoxypropionitrile, γ-butyrolactone, γ-valerolactone, ethylene carbonate, propylene carbonate, N,N-dimethylformamide, 1-methyl-2-pyrrolidinone, dimethoxyethane, 2-methoxyethyl ether (diglyme) and tetrahydrofurane.

The electrolyte usually contains the compound or compounds of formula (2) in a concentration from 0.5 mol/l up to the solubility limit which is about 2.0 mol/l at room temperature, preferably 0.7 to 1.5 mol/l and more preferably 0.8–1.3 mol/l.

When using a compound of formula (2) in combination with TEA tetrafluoroborate the sum of the concentrations of the two compounds is preferably within the range of 0.8–1.8 mol/l, more preferably about 1.0 to 1.2 mol/l, the fraction of the TEA salt being within the range of 0.2–0.7.

Electrochemical double-layer capacitors based on new electrolytes, which include the salts formed by doubly charged three-dimensional DADACO cations and tetrafluoroborate or hexafluorophosphate anions and dissolved in aprotic polar solvents as is disclosed in the present invention, can be used as back-up memory protection in personal computers, as pulse power sources for electric vehicle or spot welding applications, for load levelling the battery in hybrid power supplies of various types, etc.

The invention will now be further illustrated by means of a number of non-limiting examples.

EXAMPLE 1

Weighed samples of (DEDACO)$^{2+}$(BF$_4^-$)$_2$ corresponding to concentrations of 0.5, 0.75, 1.0, 1.25 and 1.5 mol/l were dissolved in 10 ml of acetonitrile, γ-butyrolactone or propylene carbonate, and the conductivity of the electrolytes obtained was measured at 25° C.—see the results in FIG. 1.

EXAMPLE 2

Weighed samples of (DEDACO)$^{2+}$(BF$_4^-$)$_2$ corresponding to the concentration of 1.0 mol/l were dissolved in 10 ml of acetonitrile, γ-butyrolactone or propylene carbonate, and the conductivity of the electrolytes obtained was measured at different temperature within the range of from 30° C. down to −30 or −40° C. The results are presented in FIG. 2.

EXAMPLE 3

A weighed sample of (DEDACO)$^{2+}$(BF$_4^-$)$_2$ corresponding to the concentration of 1.0 mol/l was dissolved in 10 ml of a mixture comprising γ-butyrolactone (75% vol) and diglyme (25%). The conductivity of the electrolyte obtained was measured at 25° C. The result is presented in Table 1.

EXAMPLE 4

A weighed sample of (DEDACO)$^{2+}$(BF$_4^-$)$_2$ corresponding to the concentration of 1.0 mol/l was dissolved in 10 ml of a mixture comprising propylene carbonate (75% vol) and diglyme (25% vol). The conductivity of the electrolyte obtained was measured at 25° C. The result is presented in Table 1.

EXAMPLE 5

A weighed sample of $(DBDACO)^{2-}(PF_6^-)_2$ corresponding to the concentration of 1.0 mol/l was dissolved in 10 ml of acetonitrile, and the conductivity of the electrolyte obtained was measured at 25° C. The result is presented in Table 1.

EXAMPLE 6

A weighed sample of $(DMDACO)^{2-}(BF_4^-)_2$ corresponding to the concentration of 0.5 mol/l was dissolved in 10 ml of γ-butyrolactone, and the conductivity of the electrolyte obtained was measured at 25° C. The result is presented in Table 1.

The electrolytes prepared according to Examples 1 to 6 were then tested for their conductivity at different concentration or different temperature, the conductivity being measured in a temperature-controlled cell using the OK 102/1 conductivity meter (produced by Radelkis, Hungary). The results of the measurements are plotted in the enclosed FIGS. 1 and 2 as well as in Table 1, wherein FIG. 1 represents the electrolytes of Example 1;

FIG. 2 represents the electrolytes of Example 2;

Table 1, line 1 represents the electrolyte of Example 3;

Table 1, line 2 represents the electrolyte of Example 4;

Table 1, line 3 represents the electrolyte of Example 5;

Table 1, line 4 represents the electrolyte of Example 6;

TABLE 1

Conductivity of electrolytes at 25°

| Solvent | Salt | Concentration, mol/l | Conductivity, mS · cm$^{-1}$ |
|---|---|---|---|
| γ-butyrolactone (75% vol.), diglyme (25% vol.) | DEDACO$^{2+}$(BF$_4$)$_2$; | 1.0 | 10.9 |
| propylene carbonate (75% vol.), diglyme (25% vol.) | D DACO$^{2+}$(BF$_4$)$_2$; | 1.0 | 7.8 |
| Acetonitrile | DBDACO$^{2+}$(PF$_6$)$_2$; | 1.0 | 36.0 |
| γ-butyrolactone | DMDACO$^{2+}$(BF$_4$)$_2$; | 0.5 | 10.8 |

As seen from FIGS. 1, 2 and Table 1, the electrolytes proposed in the present invention demonstrate a fairly high conductivity, which smoothly depends on temperature in various solvents.

EXAMPLE 7

An EDLC mockup was assembled under an argon atmosphere, which included two collector electrodes made of aluminium and two working electrodes of 17.7 mm in diameter made of activated carbon cloth and interleaved with a separator made of nonwoven polypropylene. The working electrodes and the separator were soaked in the electrolyte comprising 1 M $(DEDACO)^{2+}(BF_4^-)_2$ in acetonitrile. Then the mockup was cycled within the range of 1.7–3.5 V under constant current conditions (3 or 10 mA), and its capacitance and inner resistance values were determined at room temperature from the charging/discharge curves. The results are presented in Table 2.

EXAMPLE 8

An EDLC mockup was assembled under an argon atmosphere, which included two collector electrodes made of aluminium and two working electrodes of 17.7 mm in diameter made of activated carbon cloth and interleaved with a separator made of nonwoven polypropylene. The working electrodes and the separator were soaked in the electrolyte comprising a mixture of 0.7 M $(DEDACO)^{2+}(BF_4^-)_2$ and 0.5 M TEA$^-$BF$_4^-$ in acetonitrile. Then the mockup was cycled within the range of 1.7–3.2 V under constant current conditions (3 or 10 mA), and its capacitance and inner resistance values were determined at room temperature from the charging/discharge curves. The results are presented in Table 2.

EXAMPLE 9

An EDLC mockup was assembled under an argon atmosphere, which included two collector electrodes made of aluminium and two working electrodes of 17.7 mm in diameter made of activated carbon cloth and interleaved with a separator made of nonwoven polypropylene. The working electrodes and the separator were soaked in the electrolyte comprising a mixture of 0.3 M $(DEDACO)^{2-}(BF_4)_2$ and 0.7 M TEA$^-$BF$_4^-$ in acetonitrile. Then the mockup was cycled within the range of 1.7–3.2 h under constant current conditions (3 or 10 mA), and its capacitance and inner resistance values were determined at room temperature from the charging/discharge curves. The results are presented in Table 2.

EXAMPLE 10

An EDLC mockup was assembled under an argon atmosphere, which included two collector electrodes made of aluminium and two working electrodes of 17.7 mm in diameter made of activated carbon cloth and interleaved with a separator made of nonwoven polypropylene. The working electrodes and the separator were soaked in the electrolyte comprising a mixture of 0.5 M $(DEDACO)^{2-}(BF_4^-)_2$ and 0.5 M $(DBDACO)^{2-}(BF_4^-)_2$ in acetonitrile. Then the mockup was cycled within the range of 1.7–3.5 V under constant current conditions (3 or 10 mA), and its capacitance and inner resistance values were determined at room temperature from the charging/discharge curves. The results are presented in Table 2.

EXAMPLE 11

An EDLC mockup was assembled under an argon atmosphere in a specially designed polypropylene cell, which included twenty four collector electrodes made of aluminium and twenty four working electrodes 15×15 cm made of activated carbon cloth connected in parallel and interleaved with a separator made of nonwoven polypropylene. The working electrodes and the separator were soaked in the electrolyte comprising a mixture of 0.7 M TEA$^+$BF$_4^-$ and 0.8 M $(DEDACO)^{2+}(BF_4^-)_2$ in acetonitrile. Amount of the electrolyte was 480 ml, total weight of the mockup about 1 kilo including the case. This mockup was trained over a long period—first at 2.5 V for 7 weeks, and then its voltage was stepwise risen up to 2.8–2.9 V and kept at this voltage for 13 more weeks. The parameters of the cell, such as its capacitance, equivalent series resistance and self-discharge, were monitored but neither colour change nor deterioration of the cell parameters was found over the whole period of the experiments. A cycling curve obtained at the end of these long-term experiments under constant current conditions (10 A) using an ATG testing unit is presented in FIG. 4.

EXAMPLE 12

(Analog)

An EDLC mockup was assembled under an argon atmosphere, which included two collector electrodes made of aluminium and two working electrodes of 17.7 mm in diameter made of activated carbon cloth and interleaved with a separator made of nonwoven polypropylene. The working electrodes and the separator were soaked in the electrolyte comprising 1.0 M TEA⁺BF₄⁻ in acetonitrile. Then the mockup was cycled within the range of 1.7–3.2 V under constant current conditions (3 or 10 mA), and its capacitance and inner resistance values were determined at room temperature from the charging/discharge curves. The results are presented in Table 2.

EXAMPLE 13

(Prototype)

An EDLC mockup was assembled under an argon atmosphere, which included two collector electrodes made of aluminium and two working electrodes of 17.7 mm in diameter made of activated carbon cloth and interleaved with a separator made of nonwoven polypropylene. The working electrodes and the separator were soaked in the electrolyte comprising 1.0 M diethylpyrazine (see formula III above) in acetonitrile. This mockup was cycled within the range of 1.7–2.8 V under constant current conditions (3 or 10 mA), and at higher voltages its leakage current started increasing so rapidly that those voltages could not be chosen as working ones. The result is presented in Table 2.

It should also be noted that electrochemical windows for DEDACO and TEA (analog) tetrafluoroborates were recorded and compared—see FIG. 3. The data were obtained using the cyclic voltammetry on a Toray glassy carbon electrode having the diameter of 2 mm; scan rate 5 mV/s. Zero value on this figure corresponds to zero charge potential of a glassy carbon electrode in acetonitrile. As can be seen from the figure, the DEDACO based electrolyte provides a wider and more symmetrical electrochemical window than the analog chosen. This results in higher working voltage of EDLC devices based on DEDACO electrolytes, namely, 3.2–3.5 V compared to 2.8–3.2 V if TEA is used. Such an increase in working voltage, in its turn, results in 20–30% higher energy stored in an EDLC device.

TABLE 2

Capacitance, inner resistance and working voltage of the mockups of electrochemical double layer capacitors comprising electrolytes based on tetraflouroborates or hexaflourophosphates of N,N'-dialkyl-1,4-diazabicyclo[2.2.2]octanediium (DADACO)

| Salt (concentration, mol/l) | Solvent | Capacitance, F | Inner resistance Ohm | Working voltage, V |
|---|---|---|---|---|
| DEDACO²⁺(BF₄)₂ (1,0) | acetonitrile | 1.90 | 23 | 3.5 |
| DEDACO²⁺(BF₄)₂ (0,7), TEA BF₄ (0,5) | acetonitrile | 1.82 | 20 | 3.2 |
| DEDACO²⁺(BF₄)₂ (0,3), TEA BF₄ (0,7) | acetonitrile | 1.73 | 18 | 3.2 |
| DEDACO²⁺(BF₄)₂ (0,5), DBDACO²⁺(BF₄)₂ (0,5) | acetonitrile | 1.67 | 25 | 3.5 |
| TEA BF₄ (1,0) - analog | acetonitrile | 1.53 | 21 | 2.8 |
| Compound III (1.0) - prototype | propylene carbonate | — | — | 2.8 |

Although the invention has been described with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

What is claimed is:

1. An electrolyte for electrochemical double layer capacitors (EDLC) comprising tetraethylammonium (TEA) tetrafluoroborate and doubly charged cations of N,N-dialkyl-1,4-diazabicyclo[2.2.2]octanediium (DADACO) of the general formula:

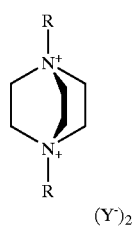

[2]

where R is the alkyl $C_1$–$C_4$, and $Y^-$ is a $BF_4^-$ or $PF_6^-$, dissolved in an aprotic polar solvent or a mixture of such solvents.

2. An electrolyte as in claim 1, wherein R is a methyl, ethyl or n-butyl radical.

3. An electrolyte as in claim 1, wherein the aprotic polar solvent or solvents includes at least one member selected from the group consisting of acetonitrile, propionitrile, 3-methoxypropionitrile, γ-butyrolactone, γ-valerolactone, ethylene carbonate, propylene carbonate, N,N-dimethylformamide, 1-methyl-2-pyrrolidinone, dimethoxyethane, methyl ethyl ketone and tetrahydrofuran.

4. An electrolyte as in claim 1, wherein the doubly charged cations of DADACO according to Formula (2) are present in a concentration from 0.5 mol/l up to the solubility limit thereof.

5. An electrolyte as in claim 1, wherein the doubly charged cations of DADACO according to Formula (2) are present in a concentration from 0.7–1.5 mol/l.

6. An electrolyte as in claim 1, wherein the doubly charged cations of DADACO according to Formula (2) are present in a concentration from 0.8–1.3 mol/l.

7. An electrolyte according to claim 1, wherein the sum of concentrations of TEA and the doubly charged cations of DADACO according to Formula (2) is within the range of 0.8–1.8 mol/l, and wherein the fraction of TEA salt is within the range of 0.2–0.7 mol/l.

8. An electrolyte according to claim 1, wherein the sum of concentrations of TEA and the doubly charged cations of DADACO according to Formula (2) is within the range of 1.0 to 1.2 mol/l, and wherein the fraction of TEA salt is within the range of 0.2–0.7 mol/l.

9. An electrochemical double layer capacitor (EDLC) which comprises an electrolyte as in any one of claims 1–8.

* * * * *

UNITED STATES PATENT AND TRADEMARK OFFICE
CERTIFICATE OF CORRECTION

PATENT NO.    : 6,491,841 B1
DATED         : December 10, 2002
INVENTOR(S)   : Maletin et al.

It is certified that error appears in the above-identified patent and that said Letters Patent is hereby corrected as shown below:

<u>Title page,</u>
Item [73], Assignee, change "Superfared Ltd." to -- Superfarad Ltd. --

Signed and Sealed this

Tenth Day of June, 2003

JAMES E. ROGAN
*Director of the United States Patent and Trademark Office*